United States Patent [19]

Chen

[11] Patent Number: 5,190,025

[45] Date of Patent: Mar. 2, 1993

[54] MOTOR VEHICLE DRINKING WATER WARMING AND HEATING DEVICE

[76] Inventor: Ning S. Chen, 44 Fu-Ghing 4th Street, Wu-Chieh Hsian, Ilan-Hsien, Taiwan

[21] Appl. No.: 678,243

[22] Filed: Apr. 1, 1991

[51] Int. Cl.⁵ ............................ F24H 1/20; B60H 1/06
[52] U.S. Cl. .................................... 126/19.5; 126/378; 137/341; 165/108; 165/154; 219/202; 237/12.3 B; 392/308; 392/456; 392/496
[58] Field of Search ............... 219/202; 392/308, 456, 392/496; 237/12.3 B; 126/19.5, 376, 378; 137/341; 165/154, 108

[56] References Cited

U.S. PATENT DOCUMENTS

| | | | |
|---|---|---|---|
| 875,310 | 12/1907 | Ayer | 126/388 |
| 1,878,364 | 9/1932 | Barrett | 165/154 X |
| 1,937,059 | 11/1933 | Fountain | 392/308 |
| 3,276,634 | 10/1966 | Arnot | 237/12.3 B |
| 3,645,327 | 2/1972 | Henley | 237/12.3 B |
| 4,162,670 | 7/1979 | Hays | 237/12.3 B |

FOREIGN PATENT DOCUMENTS 2225096 5/1990 United Kingdom ............... 219/202

Primary Examiner—Anthony Bartis
Attorney, Agent, or Firm—Larson and Taylor

[57] ABSTRACT

A drinking water warming and heating device, comprising a housing having a storage chamber inside thereof and a water circulating space set therebetween. Inside the space is a partition which divides the space into an inner and an outer water circulating space, and mounting plates connected perpendicularly on either side of the partition and extending between the housing and the chamber, the plates dividing the inner and outer water circulating spaces into vertical channels. The water circulating passage has one end connectable to the water outlet port of the engine of a motor vehicle and an opposite end connectable to the water tank of said motor vehicle permitting waste heat from engine cooling water to make heat exchange with drinking water in the water storage chamber. An electric heating element in the storage chamber is connected to the battery power supply of the motor vehicle to heat warmed-up drinking water to boil.

6 Claims, 7 Drawing Sheets

MOTOR VEHICLE DRINKING WATER WARMING AND HEATING DEVICE

BACKGROUND OF THE INVENTION

The present invention relates to a motor vehicle drinking water warming and heating device and relates more particularly to such a device which reclaims waste heat from motor vehicle engine cooling water to warm up drinking water without affecting the normal operation of a motor vehicle or increasing its power load.

In motor vehicles, a drinking fountain, a hot drinking water supply device or a refrigerator must be separately provided since they are not included in the standard equipment of a motor vehicle. Regular drinking fountains, hot drinking water supply devices or mini-refrigerators that are provided for use in motor vehicles are generally attached with an AC/DC converter so that they can be directly connected to the car battery supply of a motor vehicle. Using these types of electric appliances may consume much power which more or less affects the operation of a motor vehicle. There is provided a kind of drinking water heating device which has means to guide drinking water to circulate through the exhaust manifold of the engine of a motor vehicle permitting drinking water to be warmed up by waste heat. This drinking water warming method does not consume any extra power supply of a motor vehicle, however, the capacity of warm water supply is limited to the holding space of the pipe circulating through the exhaust manifold. Therefore, this structure of drinking water heating device is still not satisfactory in use.

In motor vehicles, heat energy is converted into kinetic energy for driving the wheels of a motor vehicle. During the converting process, energy loss and waste heat will happen. Mechanical improvement may reduce energy loss to the minimum. However, waste heat can not be eliminated if a combustion fuel system is provided for producing heat energy. Therefore, to utilize engine waste heat does not affect the operation of a motor vehicle in any case. The present invention uses the engine waste heat in the engine cooling water system of a motor vehicle circulating through an engine cooling water circulation loop associated with a drinking water warming and heating device to warm drinking water for service, which device has an electric heating element connected to the car battery supply of said motor vehicle to heat the warmed-up drinking water to boiling with less battery power consumption.

SUMMARY OF THE INVENTION

It is therefore an object of the present invention to provide a motor vehicle drinking water warming and heating device which reclaims waste heat from motor vehicle engine cooling water to warm drinking water for service. It is another object of the present invention to provide a motor vehicle drinking water warming and heating device which has means to connect an electric heating element to the socket on the instrument board of a motor vehicle for a hand lamp or cigarette lighter to heat drinking water to boil.

According to a first aspect of the present invention, there is provided a drinking water warming and heating device which comprises a housing having a drinking water storage chamber at the inside thereof and a water circulating space set therebetween, which water circulating space connects to the water outlet port of the engine of a motor vehicle by on inlet tube and connects to the water storage chamber of the motor vehicle by an outlet tube, wherein waste heat from the engine cooling water system of the motor vehicle is guided to circulate through said water circulating space so as to warm drinking water in said water storage chamber. According to a second aspect of the present invention, the drinking water storage chamber of the drinking water warming and heating device has an electric heating element set therein, which is connected to the motor vehicle's socket for a hand lamp or cigarette lighter, to heat the warmed up drinking water to a boil.

BRIEF DESCRIPTION OF THE DRAWINGS

The present invention will now be described by way of example only with reference to the annexed drawings, in which.

DETAILED DESCRIPTION OF THE PREFERRED EMBODIMENT

Figure 1:
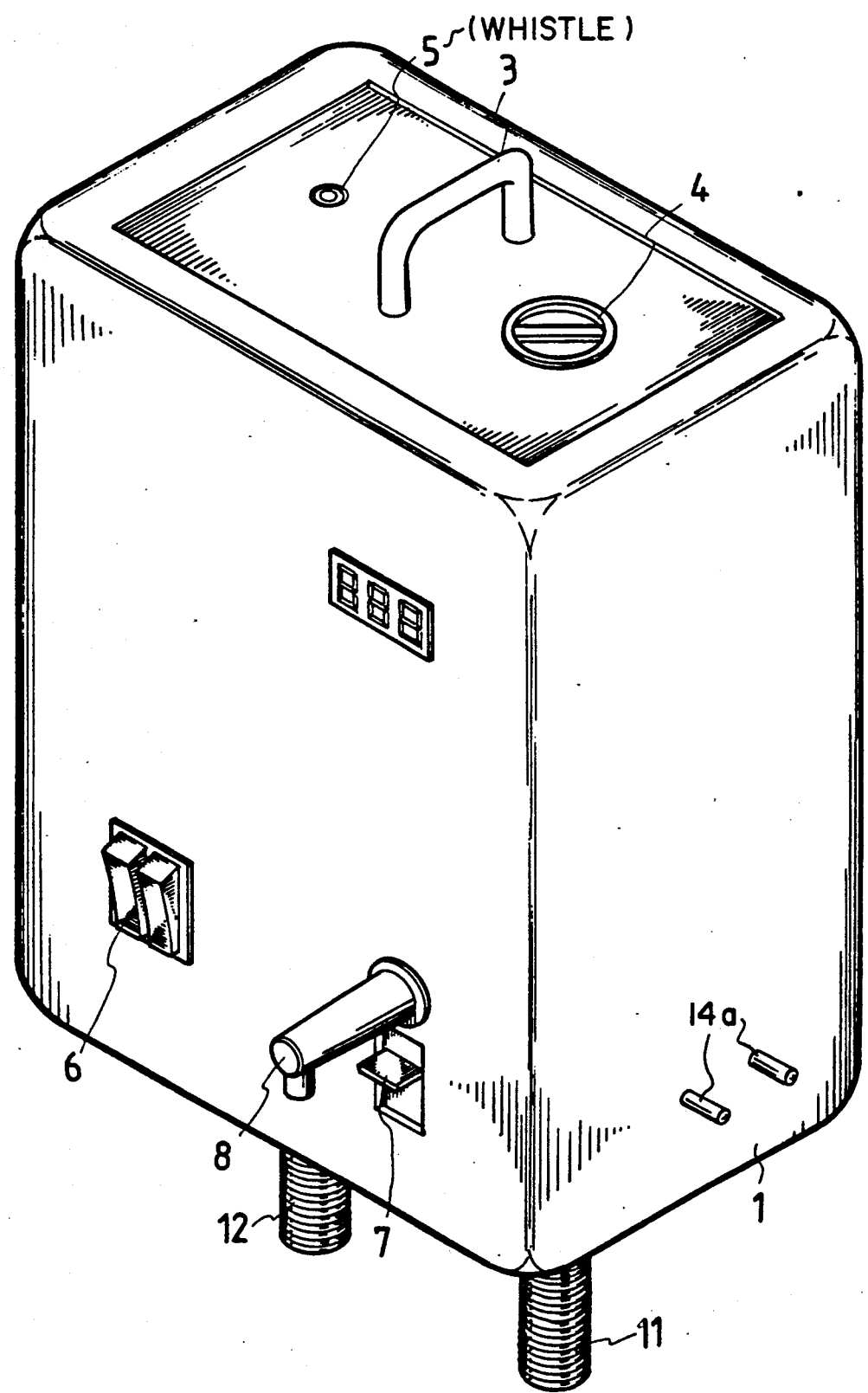
FIG. 1 illustrates the outer appearance of the preferred embodiment of the present invention.

Referring to FIG. 1, there is shown a motor vehicle drinking water warming and heating device embodying the present invention and generally comprised of a housing 1 having at the inside an enclosed water storage chamber 2 (see FIG. 2) for storing drinking water. The housing 1 has an air whistle 5, a handle 3 and a water storage chamber feeder cap 4, respectively on the top thereof. Also shown is a power switch 6, a drinking water outlet pipe 8 and a control button 7 respectively made on the front panel thereof. By removing the water storage chamber feeder cap 4 from the housing 1, drinking water is fed into the water storage chamber 2. Through the control of the power switch 6, the car battery is electrically connected to an electric heating element 14 (FIG. 4) heat the drinking water in the water storage chamber 2. Through the control of the control button 7, drinking water is permitted to discharge through the outlet pipe 8. As soon as drinking water in the water storage chamber 2 is boiled, the air whistle 5 is immediately triggered by steam to produce a warning sound.

Figure 2:
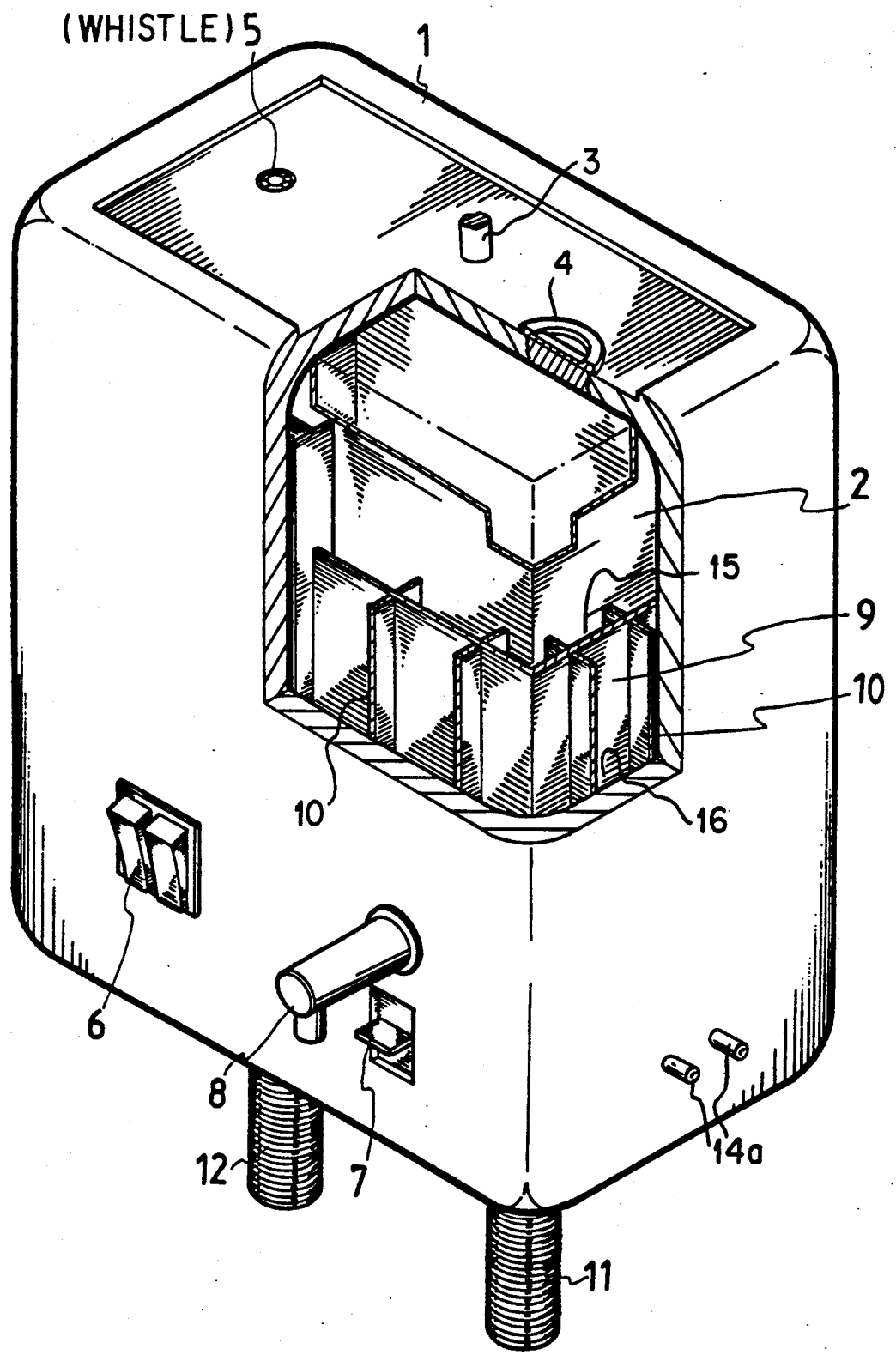
FIG. 2 is a perspective and partly cut off view with some external parts removed of the preferred embodiment of the present invention.
Figure 3:
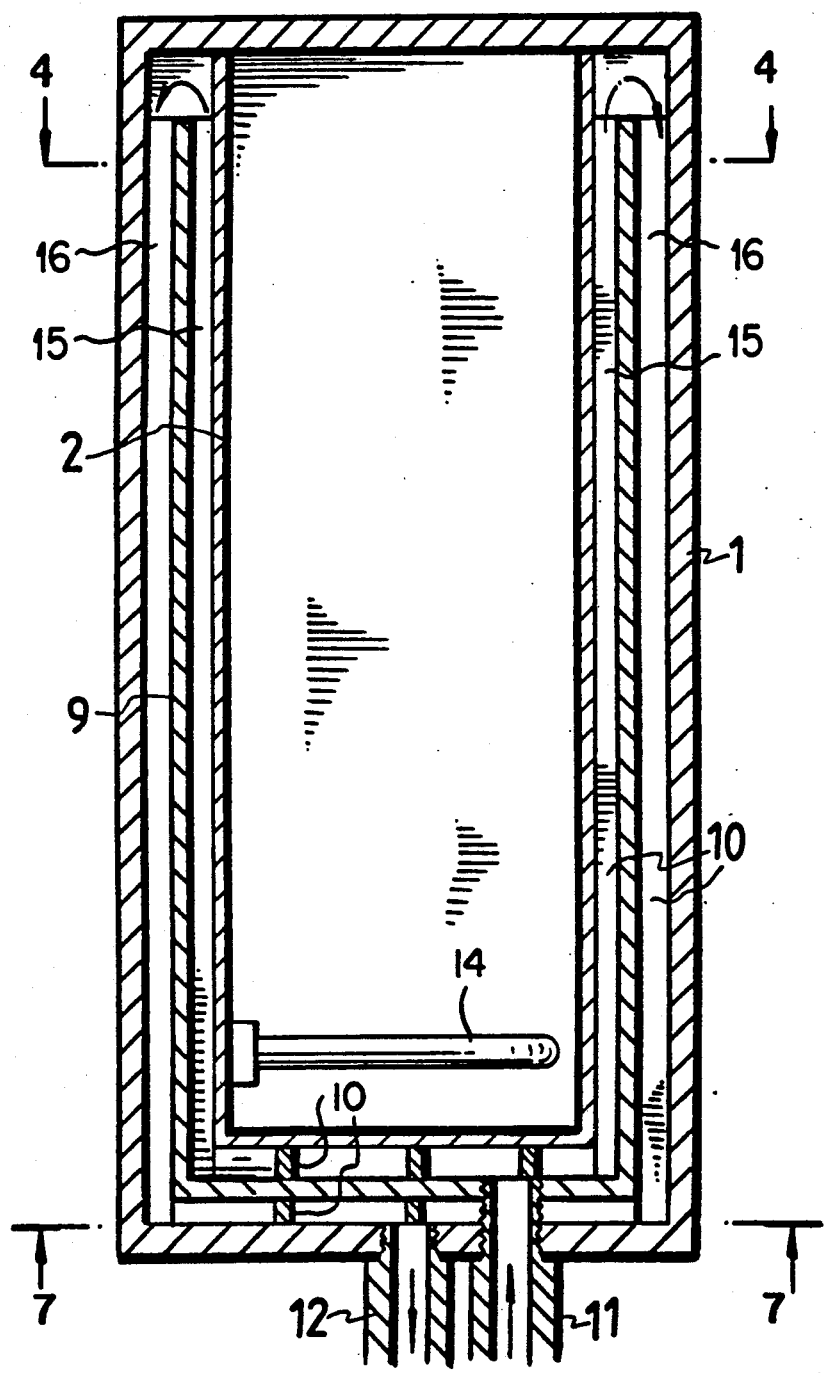
FIG. 3 is a sectional view taken on line 3—3 of FIG. 5.

Referring to FIG. 2, there is provided an intermediate partition 9 set inside the housing 1 dividing the space between the housing 1 and the water storage chamber 2 into an inner water circulating space 15 and an outer water circulating space 16. The partition is positioned around the sides and bottom of chamber 2. There are provided a plurality of reinforcing plates 10 respectively attached to the intermediate partition 9 in orthogonal relation wherewith at suitable locations to firmly support the intermediate partition 9 in position. An engine cooling water intake pipe 11 is connected through the middle bottom area of housing 1 to the inner water circulating space 15 to guide waste hot water from the engine cooling water system of a motor vehicle to warm up drinking water in the water storage chamber 2. An engine cooling water outlet pipe 12 is connected through the bottom wall of housing 1 to the outer water circulating space 16 to guide waste hot water from the inner water circulating passage 15 to the water tank of the motor vehicle. The aforesaid circulation of waste hot water through the inner and outer water circulating spaces 15 and 16 is shown in FIG. 3.

Figure 4:
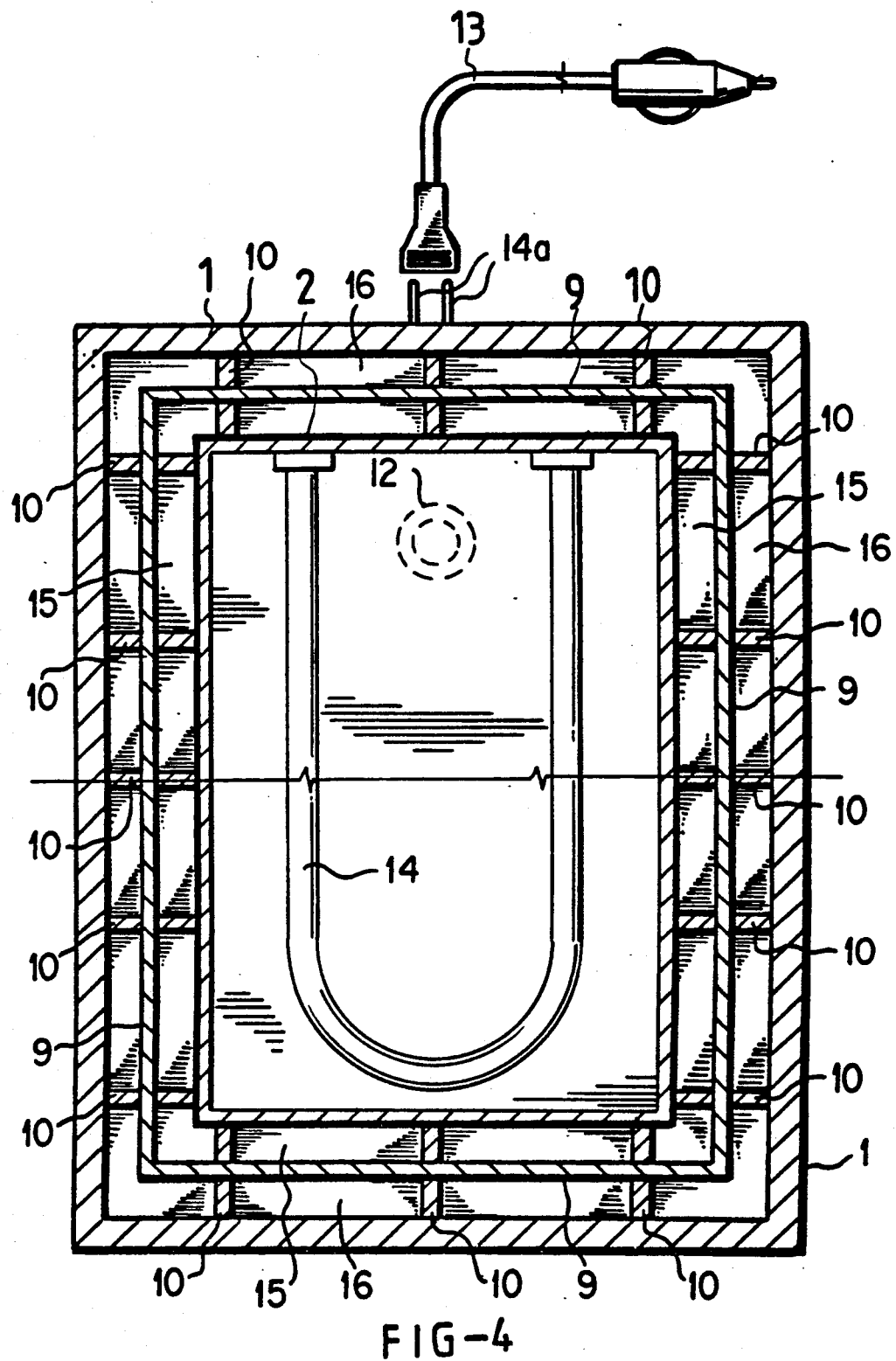
FIG. 4 is a sectional view taken along 4—4 of FIG. 3
Figure 5:
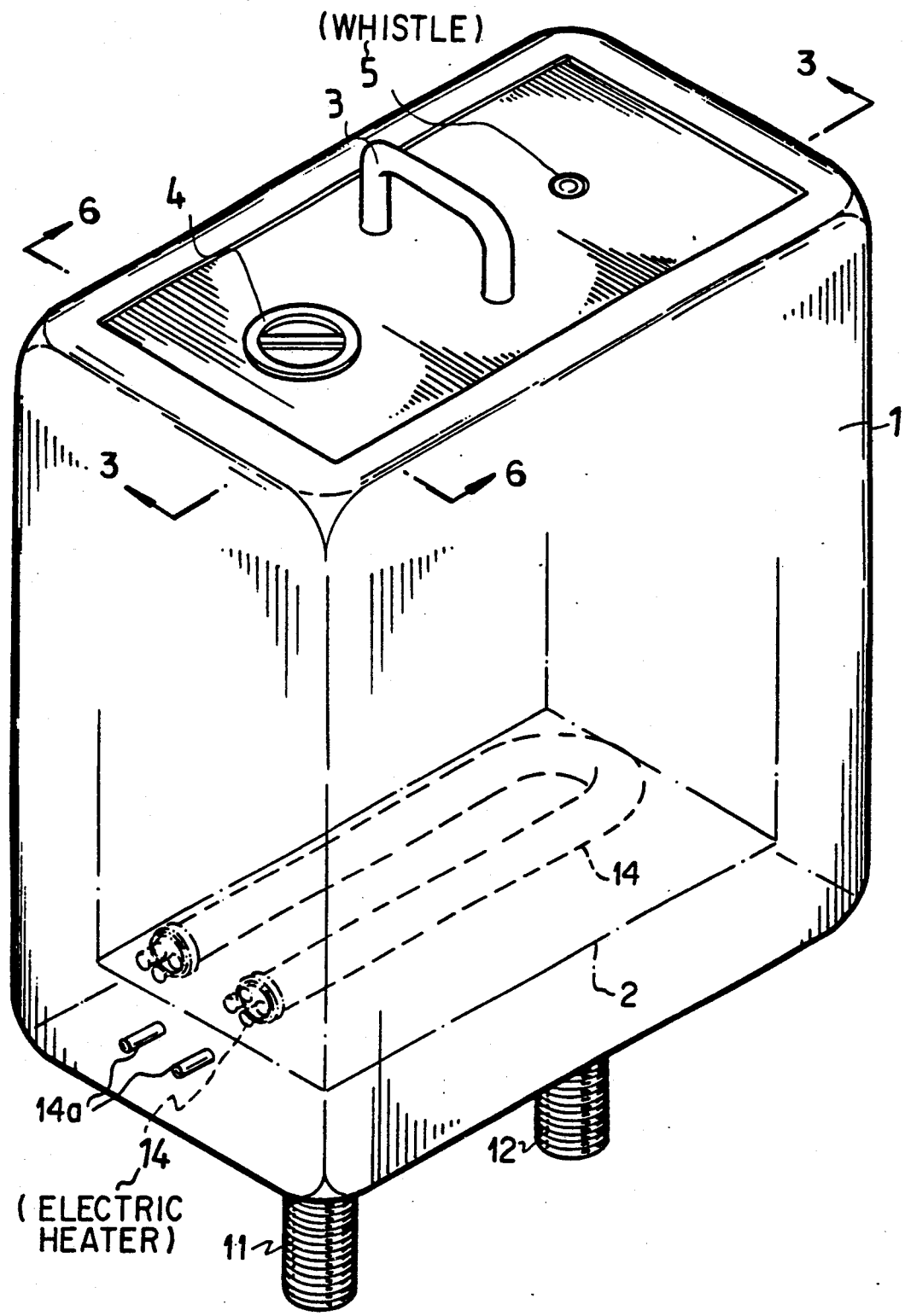
FIG. 5 is a perspective view of the preferred embodiment of the present invention showing the position of the electric heating element inside the housing.

FIG. 4 is a transversely cross sectional view of the preferred embodiment of the present invention, showing the relative locations between the housing 1, the water storage chamber 2, the intermediate partition 9 and the reinforcing plates 10. The housing 1 further comprises an applicance plug 13 for connecting an exterior plug 14a to an electric heating element 14 (FIG. 5), which is fastened inside the water storage chamber 2 at the bottom, to a socket on the instrument board (not shown) for a hand lamp or cigarette lighter so that car battery power can be connected to the electric heating element 14 to heat the drinking water in the water storage chamber to the boiling point.

Figure 6:
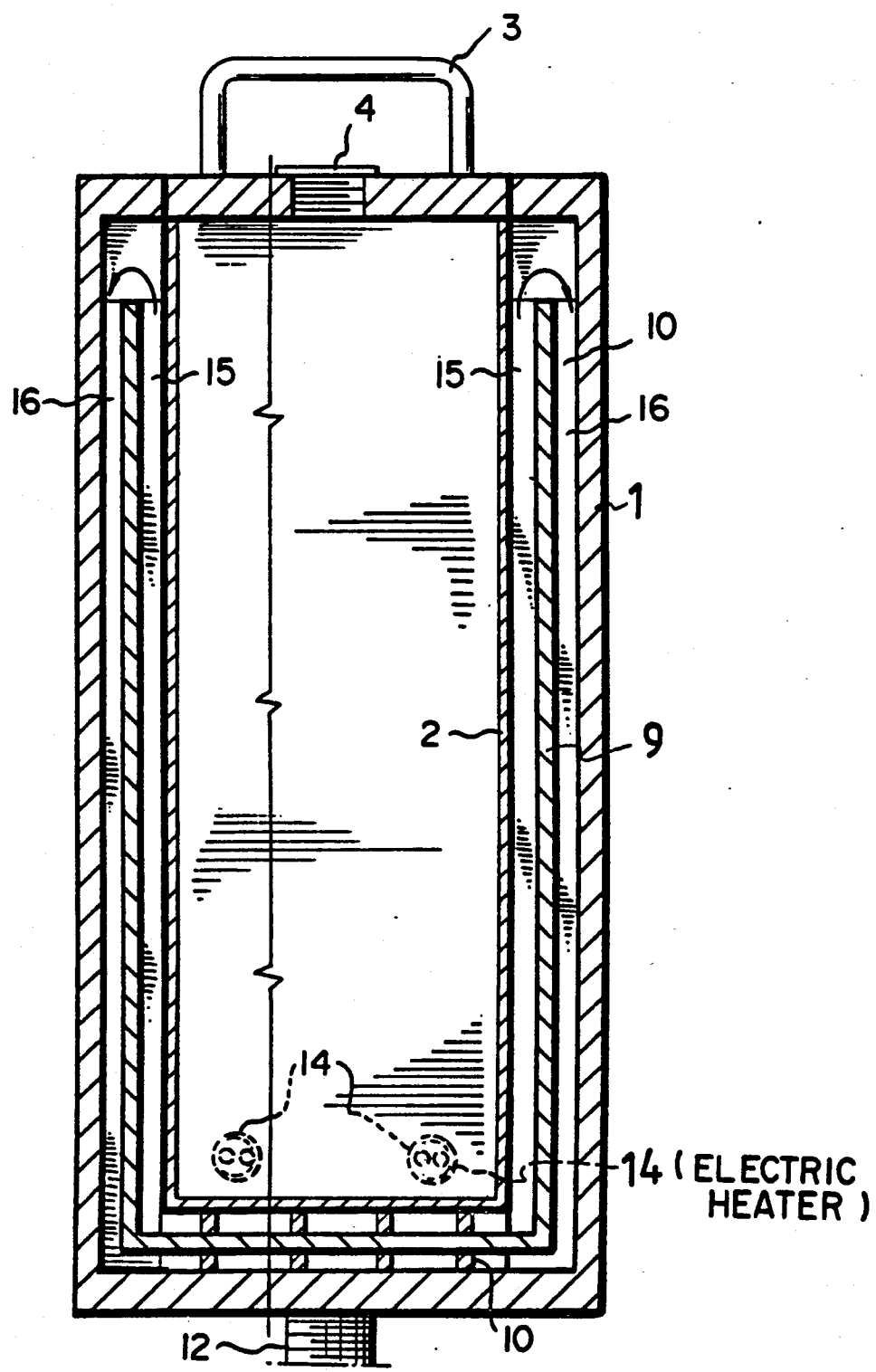
FIG. 6 is a sectional side view taken on line 6—6 of FIG. 5 taken in the longitudinal direction.
Figure 7:
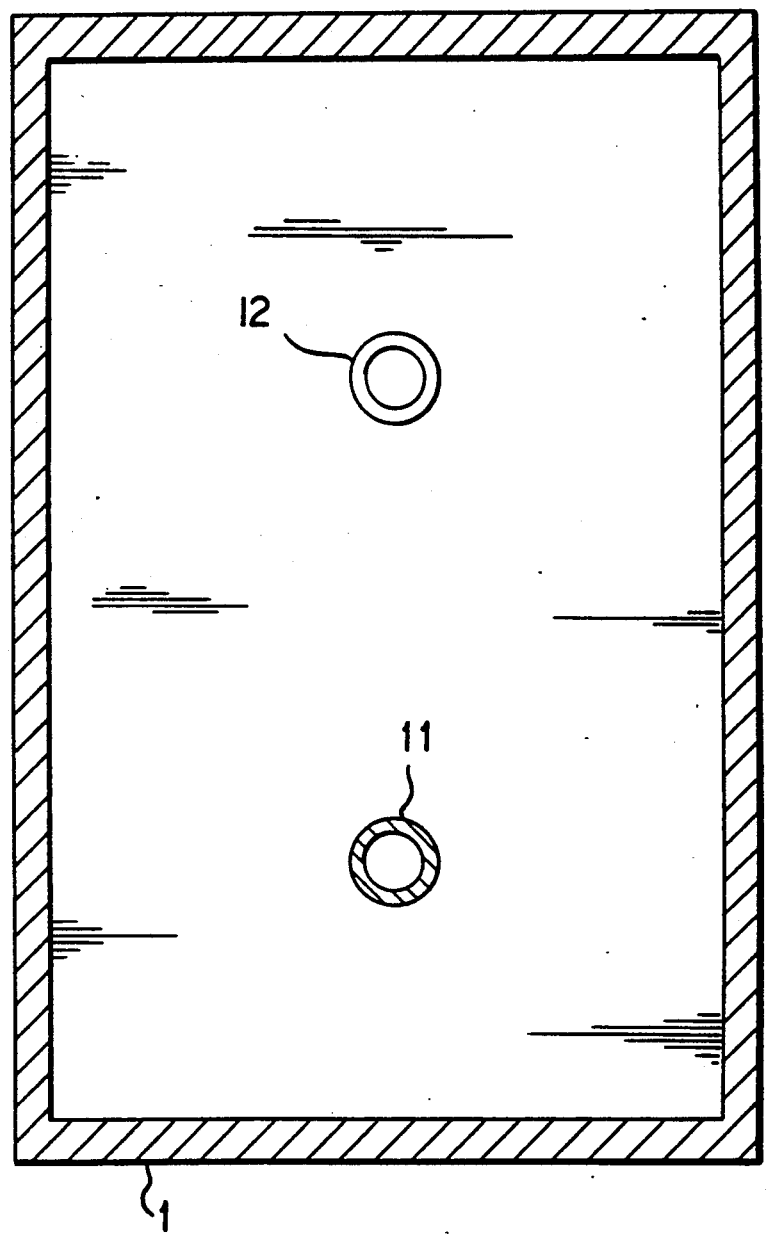
FIG. 7 is a sectional view taken along 7—7 of FIG. 3.

Referring to the longitudinally sectional view of FIG. 6, the intermediate partition 9 is disposed between the water storage chamber 2 and the housing 1 to divide the space therebetween into an inner and an outer water circulating space. Referring to the sectional bottom view of FIG. 7 (also FIGS. 3 and 6), waste hot water from the engine cooling water intake pipe 11 is guided into the inner water circulating space 15. As soon as the inner water circulating space 16 is overflowed with waste hot water, waste hot water immediately flows down (as shown by the arrows) into the outer water circulating passage to further be guided to the water tank of the motor vehicle via the engine cooling water outlet pipe 12.

As indicated, the present invention fully utilizes waste heat from an engine cooling water system in a heat exchanger. To heat drinking water in the water storage chamber. Thus, drinking water is warmed up and, hot water from the engine of the motor vehicle is simultaneously cooled down for further circulation in cooling the engine. Because drinking water is warmed up by engine cooling water, it can be boiled quickly by the electric heating element with much less power consumption.

What is claimed is:

1. A drinking water warming and heating device comprising:
   a housing having walls defining an interior space therein;
   a storage chamber having walls located inside said space in spaced relationship to said housing walls to define a water circulating space between said chamber and said housing;
   a partition set in said housing in said water circulating space to divide said water circulating space into an inner water circulating space and an outer water circulating space, wherein said partition extends vertically in said water circulating space;
   a mounting means connected to said partition and located in said water circulating space for mounting said partition spaced between said housing walls and said chamber walls, and wherein and mounting means comprises vertically extending plates located in said outer circulating space and connected between said partition and said housing walls;
   an engine cooling water intake port in communication with said inner space and connectable to an engine of a motor vehicle having a water tank, and said intake port directing hot engine cooling water into said inner water circulating space; and
   an engine cooling water outlet port in communication with said outer water circulating space and connectable to the water tank of the motor vehicle to guide the hot engine cooling water from said outer water circulating space to the water tank;
   said inner water circulating space and said outer water circulating space being in communication with each other at a location remote from said inlet and outlet ports such that the cooling water circulates from said inlet port through said inner space, into said outer space, and thence out said outlet port.

2. The device claimed in claim 1 wherein said plates divide said outer water circulating space into a plurality of vertical water channels.

3. The device claimed in claim 1 wherein said mounting means further comprises vertically extending plates located in said inner water circulating space and connected between said partition and said chamber walls.

4. The device claimed in claim 3 wherein said plates extend perpendicularly between said partition and said housing walls and between said partition and said chamber walls.

5. The device as claimed in claim 4 wherein at least some of said plates in said inner water circulating space are coplanar with corresponding ones of said plates in said outer water circulating space.

6. The device as claimed in claim 1 wherein said inner water circulating space and said outer water circulating space are in communication with each other at the top portion of said housing, and said inlet and outlet ports are located at the bottom portion of said housing.

* * * * *